United States Patent [19]

Cole

[11] Patent Number: 4,541,795

[45] Date of Patent: Sep. 17, 1985

[54] INJECTION MOLD FOR A BOTTLE CLOSURE DEVICE

[75] Inventor: Harold E. Cole, Magalia, Calif.

[73] Assignee: James R. Goldberg, Navoto, Calif.

[21] Appl. No.: 636,151

[22] Filed: Jul. 31, 1984

[51] Int. Cl.[4] .......................... B29C 1/00; B29D 1/00; B29F 1/14

[52] U.S. Cl. .................................... 425/437; 425/438; 249/59; 249/66 R; 249/66 C; 249/142

[58] Field of Search ................. 249/58, 59, 66 C, 142; 425/437, 438

[56] References Cited

U.S. PATENT DOCUMENTS

| | | | |
|---|---|---|---|
| 3,461,488 | 8/1969 | Croyle | 425/438 X |
| 3,706,116 | 12/1972 | Drazick . | |
| 3,737,277 | 6/1973 | Uhlig | 249/59 X |
| 3,749,538 | 7/1973 | Rudnev . | |
| 3,940,103 | 2/1976 | Hilaire | 249/59 X |
| 4,052,137 | 10/1977 | Pietzner . | |
| 4,105,385 | 8/1978 | Hehl . | |
| 4,125,246 | 11/1978 | von Holdt | 425/437 X |
| 4,155,687 | 5/1979 | Grünner . | |
| 4,155,698 | 5/1979 | Aichinger | 249/59 X |
| 4,375,948 | 3/1983 | von Holdt | 425/437 |
| 4,474,302 | 10/1984 | Goldberg et al. . | |

*Primary Examiner*—J. Howard Flint, Jr.
*Attorney, Agent, or Firm*—Fitch, Even, Tabin & Flannery

[57] ABSTRACT

A mold and a molding method are described for forming a closure device having a cap portion, a cylindrical plug portion extending therefrom, and a cylindrical collar extending substantially coextensively and coaxially with the plug portion spaced therefrom to provide an annular recess for receiving the open end of the container to be closed. The mold cavity is defined by mold segments and by a substantially cylindrical hollow outer core which extends into the mold cavity and defines the annular recess in the closure device between the collar and the plug portion. The mold segments include a gripping portion for retaining the closure device. The gripping portion retains the closure device while the outer core is extracted from the cavity. The gripping portion of the mold segments is then separated along with the remainder of the mold segments to remove the molded device.

9 Claims, 7 Drawing Figures

INJECTION MOLD FOR A BOTTLE CLOSURE DEVICE

This invention relates generally to safety closure devices for use on bottles containing pressurized beverages such as champagne or sparkling wines. More specifically, the invention relates to an improved mold for forming such safety closure devices and to an improved method for forming such a device.

The drinking of champagne or sparkling wine is usually associated with happiness and frivolity. Unfortunately, the happiness and frivolity has all too often ended in tragedy because of injuries caused by flying corks. Because of pressure inside a bottle of champagne or sparkling wine, particularly if the wine has been shaken or is warmer than recommended, a cork can be propelled from the bottle at a velocity of well over 120 Kph. As a consequence, unattentive individuals opening the bottle, or persons standing nearby, can be seriously injured.

The problem of premature or inadvertent explosive release of champagne corks is axacerbated by the fact that many lower priced champagnes and sparkling wines are closed by molded plastic corks. Plastic corks possess an even greater tendency than natural corks to become dislodged as a result of internal pressure in the bottle. In addition, the slipperiness of plastic is sometimes increased when the cork is molded because of a residue of the release agents often used to facilitate removal of a hot plastic cork from the mold in which it is made. Wetness on the glass surface of the bottle as a result of condensation or seepage of the contents can also reduce friction between the surface of the glass and the surface of the plastic cork.

An improved closure device for a bottle or the like which is particularly well suited for use in connection with champagne and sparkling wines is shown and described in U.S. Pat. No. 4,474,302. The device shown and described therein employs a tabbed tear strip and a tether strip that are integrally formed in an outer retaining collar which fits over the neck of the bottle. When the tear strip is torn away, a helical tether strip remains interconnecting the plug or cork and the retainer collar. The cork or plug may thus be easily released from the bottle but is restrained from flying free.

The foregoing device provides a significant improvement in closures for bottles and other containers containing pressurized liquids such as champagne or sparkling wines. The need for additional restraining devices such as wire baskets, shrink wraps, or the like is eliminated. Moreover, it is unnecessary for the person opening the bottle to manually restrain the champagne cork as it is being removed from the bottle.

The improved closure device of the aforementioned copending application has a cap portion, a cylindrical plug portion extending therefrom, and a cylindrical collar extending substantially coextensively and coaxially with the plug portion. The collar and the plug are spaced from each other to provide an annular cavity for receiving the open end of the container to be closed. Thus, with the plastic closure mounted in place, the plug extends into the opening in the container and the collar surrounds the outside of the container at the opening to retain the plug in position.

The molding of a plastic closure device is typically carried out in an injection molding machine. Such machines usually employ a plurality of die or mold plates and, in appropriate cases, a movable core. The mold plates and core move once the piece is molded to separate and enable removal of the molded device from the mold. Where, as is the case with the improved plastic closure device which is the subject matter of this invention, there are two portions extending substantially coextensively and coaxially with each other, the molding procedure and mold may be extraordinarily complex. With a cylindrical device, a collapsible mold core may be provided making removal of the molded part after molding relatively simple. However, in the present case, a collapsible core is not practical due to the presence of the plug portion of the closure device coextensive and coaxial with the surrounding cylindrical collar. This problem is exacerbated where the collar is provided with an annular recess for mating with a retaining ring on the bottle or other container because of the difficulty the needed core shape presents in withdrawing the core from the annular cavity between the plug portion and the cylindrical collar.

It is an object of the present invention to provide an improved mold for forming a molded closure device.

Another object of the invention is to provide an improved mold for forming a molded closure device having a cap portion, a cylindrical plug portion extending therefrom, and a cylindrical collar extending substantially coextensively and coaxially with the plug portion spaced therefrom to provide an annular cavity for receiving the open end of the container to be closed.

Still another object of the invention is to provide an improved mold for molding such a closure device wherein the cylindrical collar is provided with an annular recess on its interior surface for retaining the collar on the container to be closed.

Other objects of the invention will become apparent to those skilled in the art from the following description, taken in connection with the accompanying drawings wherein.

Figure 2:
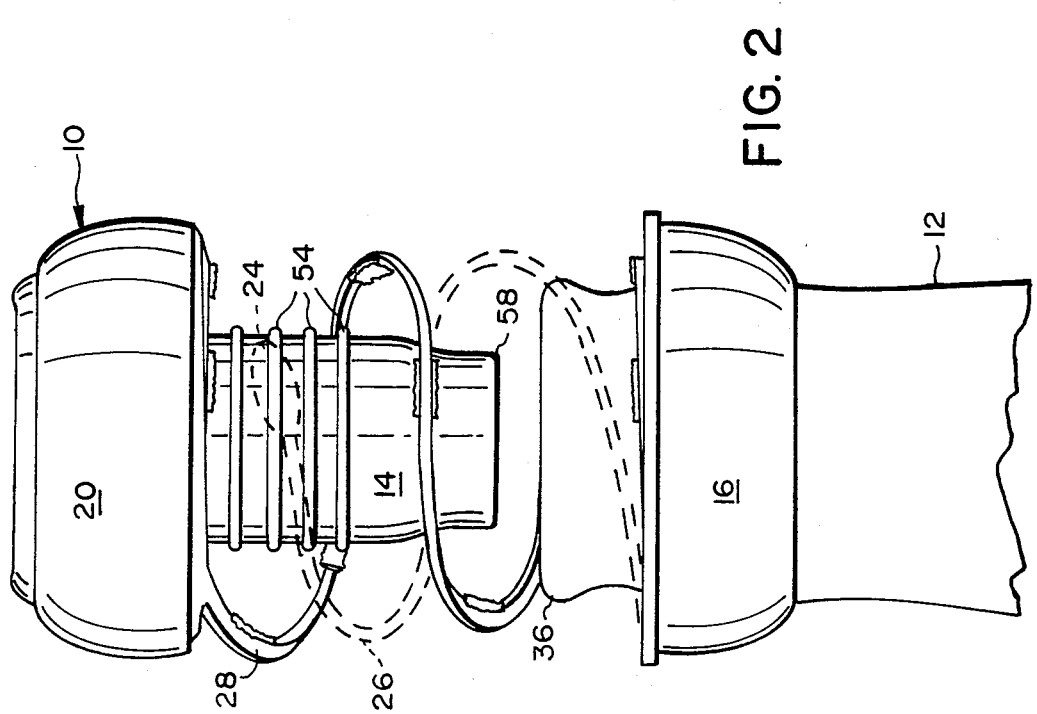
FIG. 2 illustrates the device of FIG. 1 after removal of the tear strip and removal of the plug from the bottle, showing how the helical tether restrains the plug.

Very generally, the mold of the invention comprises mold means 103, 105, 107 enclosing a mold cavity defining the outer surface of the closure device to be molded. A substantially cylindrical hollow outer core means 109 extends into the mold cavity and defines the annular cavity in the closure device 10 including the inner surface of the cylindrical collar 16 and the outer surface of the plug portion 14. The mold means include a gripping portion 105 for retaining the closure device when the outer core means are extracted from the annular cavity.

In the method of using the mold, moldable material is injected into the mold cavity and the outer core means 109 is extracted while the gripping portion 105 retains the closure device. The mold means including the gripping portion are then separated from the closure device to remove the closure device from the mold cavity.

Figure 1:
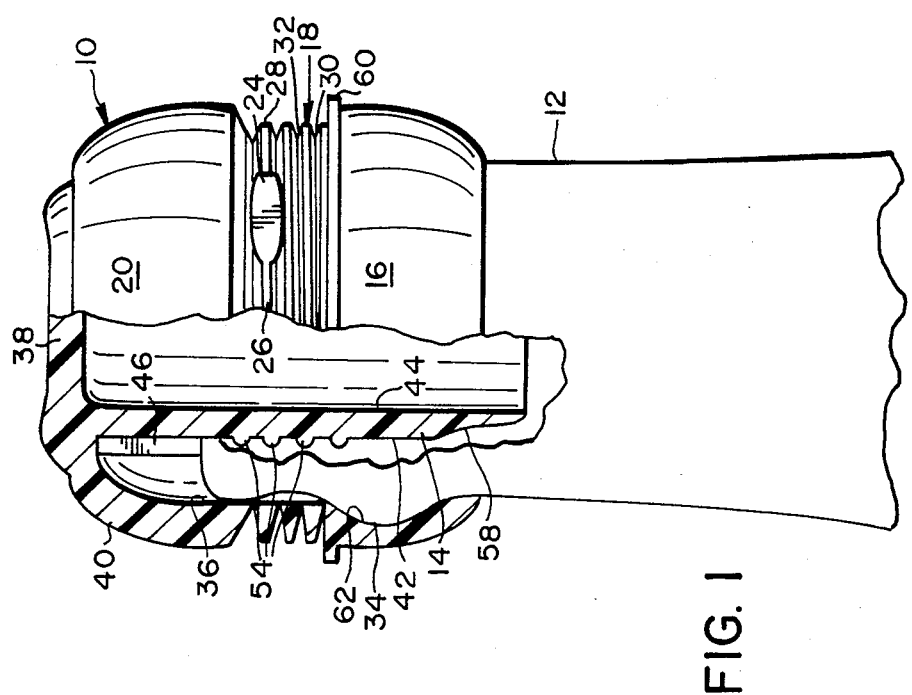
FIG. 1 illustrates a closure device of the type to which the invention is directed, with the device being partially sectioned to illustrate its position on a bottle.

A closure device of the type to which the present invention relates is illustrated in FIGS. 1 and 2. The safety closure device 10 is shown mounted on the neck of a bottle 12 designed to hold pressurized liquids such as champagne or other sparkling wines. The device 10 includes a cork or plug 14 and a retainer collar 16 both connected to a cap portion 20.

The plug 14 is adapted to close the mouth of the bottle by frictional engagement with the interior facing surface of the mouth. An intercoupling section 18 is provided in the collar 16 comprised of a tabbed 24 tear strip 26 and a tether strip 28 that are formed integrally in the intercoupling section as parallel helices extending from the cap 20 to the collar 16. The tether strip 28 and the tear strip 26 are interconnected by a pair of grooved frangible webbed sections 30 and 32. The thickness and configuration of the pair of grooved frangible webbed sections, described with particularity below, are preselected to be less than the thickness of the tether and tear strips. The tear strip 26 also contains the integral pull tab portion 24 which provides an easy and convenient means for grasping the tear strip 26 prior to its removal as described below.

When the pull tab portion 24 of the tear strip 26 is grasped and pulled by one wishing to open a bottle of sparkling wine, the tear strip 26 separates from the tether strip 28 because of a tearing of the frangible web sections 30 and 32 along the path of the grooves between the tether and tear strips. When the helical tear strip 26 is removed, the helical tether strip 28 remains to interconnect the plug or closure element 14 and the collar 16, thus enabling the element 14 to be released from the bottle 12 without flying free.

The bottle 12 in FIGS. 1 and 2 is typical of bottles used to contain champagne and sparkling wines. Such bottles often have elongated, tapered, cylindrical necks containing a circumferential bulge or ridge 34 (known to the trade as a "finishing or bead ring") just below a lip 36 at the top of the bottle. The circumferential ridge 34 protrudes from the side of the bottle with sufficient radius to provide a means for restraining or impeding objects or devices, fastened above or below it, from moving up or down the neck of the bottle. In the past, such objects and devices have included, for example, woven wire baskets used to restrain plugs or corks. In the present invention, the circumferential ridge 34 is used to restrain the retainer collar 16.

The closure device 10 is preferably formed of a molded unitary piece of a suitable resilient substance. While polymerized plastic is a preferable resilient substance, other resilient substances are suitable as long as they are weak in shear when thin but strong in tension when thick. As used herein, "weak in shear when thin" means a substance that is manually tearable when used at the preselected thickness of the thin frangible webs connecting the tear and tether strips. "Strong in tension when thick" means that, at the thickness of the tether strip, the substance is strong enough to withstand longitudinal strain caused by sudden release of the cork from the bottle.

For purposes of this invention, a suitable resilient substance will be moldable. A suitable resilient substance will also have sufficient resiliency to allow the tapered retainer collar 16 to stretch but not break as it is inserted over the neck of the bottle, including the circumferential ridge 34. Following the expansion necessary to allow the tapered retainer collar 16 to pass over the circumferential ridge 34, a suitable material will preferably have sufficient resiliency to allow the inner surface of the collar to assume a shape that conforms generally to the contour of the outside of the bottle.

The cap 20 is of generally cup-like shape and is comprised of a circular disk-like top portion 38 integrally molded with a hollow cylindrical side portion 40. The diameter of the cap's circular top portion 38 is greater than the diameter of top of the bottle neck. The inner circumference of the cap's hollow cylindrical side portion is greater than the outer circumference of the lip 36 at the top of bottle.

The top of the plug 14 is connected to the inside of the circular disk-like top portion 38 on the cap 20. The plug 14 is preferably hollow having an outer cylindrical wall surface 42 and an inner cylindrical wall surface 44. In the preferred form of the present device, three thin radial ribs, spaced approximately 120° apart, protrude from the plug's top circumferential outer wall surface 42. One such radial rib 46 is shown in FIG. 1. The top portion of the radial ribs may fuse with the inside surface of the circular disk-like top portion of the cup-like cap 20 or may, as shown, be spaced from it. The ribs' inner sides extend down and are fused with the outer wall of the plug 14. The area of the plug 14 where the radial ribs are located is referred to herein as "the anterior portion" of the inner plug 14.

The radial ribs are slightly shorter in length than the length of the cylindrical side portion 40 of the cup-like cap 20. The ribs are of sufficient diameter to assure that the combination of inner plug plus radial ribs will have a diameter greater than the diameter of the opening at the top of the bottle. This is to allow the bottom of the radial ribs to come into contact with lip 36 at the top of bottle 12 thus preventing the anterior portion of the plug 14 from being pushed down into the neck of the bottle as a result of a downward force on the cap 20.

While three ribs spaced approximately 120° apart are preferred, two ribs spaced approximately 180° apart, or four or more ribs spaced around the circumference of the plug can be used as long as they function to prevent the anterior portion of the plug 14 from being pushed down into the neck of the bottle as a result of downward force on cork cap 20.

The cylindrical plug 14 has an outer diameter very slightly smaller than the diameters of the opening at the top of the bottle and the upper inner portions of the bottle neck. This allows the plug to fit tightly down into the neck of the bottle.

About half-way down the length of the plug 14, a series of parallel annular ridges 54 protrude slightly from the plug's outer wall surface 42. The width and height of the annular ridges are approximately equal. The annular ridges extend down the outer wall 42 of the plug to a point approximately in line with the bottle's circumferential ridge 34 when the device 10 is in place in a bottle 12. When in place, the circumferential wall of the plug 14 supports the annular ridges against the inner wall of the bottle neck. As a result, the annular ridges grasp against the side of the bottle helping to seal its contents.

The outer wall surface 42 of the plug 14 is smooth below the annular ridges 54. When the tethered safety device is placed on a bottle, this smooth area will be in contact with the neck of the bottle near where the bottle's circumferential ridge 34 is located. The lower end portion 58 of the plug 14 is tapered. The tapered end portion 58 is provided so that its outer diameter is progressively less than the outer diameter of the rest of the plug. The thickness of the plug's wall also progressively diminishes in the region of the tapered end portion 58. This narrowing and thinning at the bottom of the plug helps guide the plug down into the neck of the bottle.

The intercoupling section 18 joins the cap 20 and the retainer collar 16. The intercoupling section is comprised of a tabbed 24 tear strip 26 and a tether strip 28. The tab 24 on the tear strip 26 may be suitably roughened, not shown, to help prevent the tab from slipping when grasped by a person wishing to remove the tear strip from the closure device.

The tear strip 26 and the tether strip 28 are formed integrally in parallel helices extending from the cap 20 to the collar 16. The tear and tether strips do not begin at the same region, nor do they end in the same region on the collar. They preferably begin or end separated from one another by an arc sufficient to permit complete separation of the tear strip from the closure device.

The tear and tether strips extend in one or more turns from the cap 20 to the collar 16. Any number of turns can be used in the present device as long as they allow the tether strip to permit removal of the cork while still adequately restraining the cork from flying free. Between one and two turns is preferred. It is preferred that the tear strip begin and end at a parting line of the mold.

The tether strip 28 and the tear strip 26 are interconnected by a pair of grooved frangible webs 30 and 32. The grooves between the tether strip and the tear strip, formed by the frangible webs, extend from the cap 20 to the collar 16. As may be seen in FIG. 7, the webs are not continuous, but are broken by a series of openings 59 which facilitate removal of the tear strip. The segments of the webs are selected in size and number to provide sufficient strength to maintain a cohesive structure until removal of the tear strip. The tear strip 26 is removable by manually causing the webs to tear. Following removal of the tear strip 26, the tether strip 28 remains attached to the cap 20 and the collar 16 by means of a merging brought about by a gradual diminution of the depth of the groove separating the cap or collar material from the initial or final tether turns. A portion of each of the webs may be left at the respective termini of the tether after removal of the tear strip. These residual portions tear to absorb energy in the event of an unusually violent ejection of the closure element from the bottle.

In addition to providing the means for connecting the cap 20 to the retainer collar 16, the intercoupling section 18 creates an integral tamperproof safety seal between the cap 20 and the collar 16 because it unmistakably indicates by dismemberment if the product has been prematurely opened or tampered with anywhere between the bottler's facilities and the end user's location.

The retainer collar 16 is comprised of a hollow tapered cylinder that fits around the top outside portion of the bottle neck. At the lower end of the intercoupling section 18, a small circumferential ridge 60 is provided that protrudes from the outer surface of the collar 16. The ridge 60, along with the top portion 38 provide bearing surfaces for automated high-speed insertion of the closure device on bottles. Just below ridge 60, on the inner surface of the collar wall, the collar contains a circumferential groove or annular recess 62. The shape and size of the recess 62 generally mirrors and approximates the shape and size of circumferential ridge 34 on the outer surface of the champagne or sparkling wine bottle. When the tethered safety closure device 10 is installed on a champagne or sparkling wine bottle, the collar's annular recess 62 fits around the circumferential ridge 34 on the neck of the bottle, thus holding the collar in place. Security of the collar on the bottle neck is assured by providing sufficient thickness in the wall of the collar below the groove 62 to prevent upward movement of the collar 16.

Because of the design of the tethered safety closure device and the material used to construct it, the unitary tethered safety closure device of the present invention can easily be inserted on bottles containing champagne or sparkling wine. The resiliency of the material used to make the tethered safety closure device allows it to expand and contract as necessary to fit securely in and around the neck of the bottle. This resiliency can be increased with heat if the properties of the material so warrant.

Figure 3:
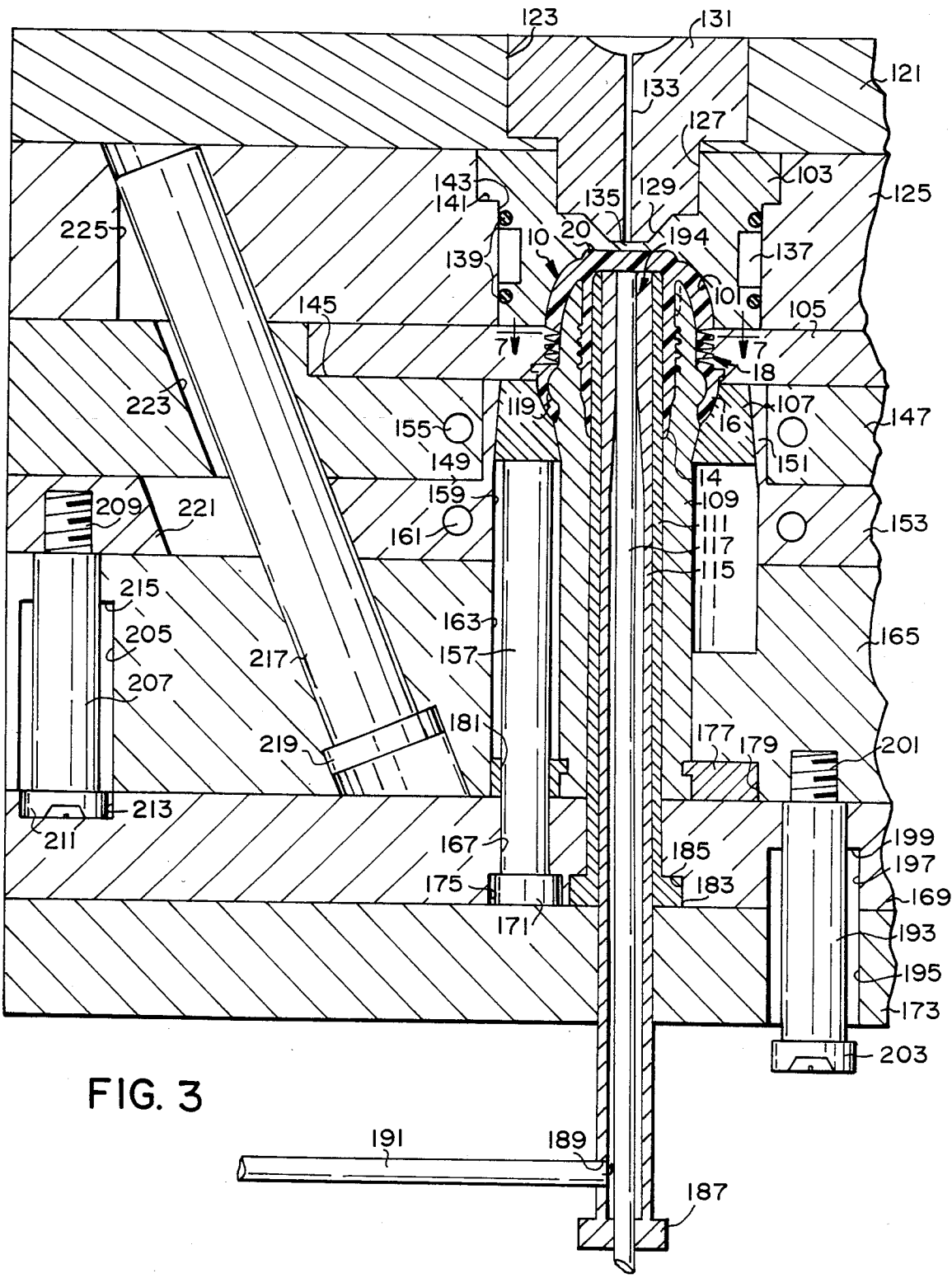
FIG. 3 is a schematic full section view of injection molding apparatus illustrating the closure device of FIG. 1 as molded in a mold cavity formed by the mold of the invention.

Referring now more particularly to FIG. 3, a preferred form of the mold of the invention is illustrated in position in a multi-mold plate injection molding machine. The mold cavity, indicated generally 101, is defined by an upper mold segment 103, a central mold segment 105, a lower mold segment or end portion 107, a substantially cylindrical outer core 109 and a substantially cylindrical inner core 111. The upper mold segment 103 is formed to have a cavity surface defining the outer surface of the cup-like cap 20 of the closure device. The central mold segment 105 is shaped to form the outer surface of the intercoupling section 18 of the closure device comprising the tear strip and tether region. The lower mold segment forms the outer surface of the collar 16. The outer core 109 is shaped to define the recess between the collar 16 and cylindrical plug 14. The central core 111 defines the interior surface of the cylindrical plug 14 of the closure device, which in the illustrated embodiment is hollow. Completing the mold means is an air ejection tube 115 extending coaxially within the inner core means 111, and a retractable air plug 117 coaxial and coextensive therewith.

It may be noted from FIG. 3 that the lower mold segment or end portion 107 and the outer core 109 engage each other below the lower edge of the collar 107 to close the mold cavity. In addition, the outer core 109 and the inner core 111 engage at the lower end of the plug 14 to close the mold cavity. The outer wall of the outer core is provided with a suitable shape to conform with the inner surface of the collar 16 and cup shaped portion of the cap 20, and includes an annular protuberance or circumferential ring 119 which forms the annular recess in the inner surface of the collar 16. Grooves, not shown, may be provided in the outer core 109 at suitable locations to form the webs 46 (FIG. 1).

The injection molding machine, as may be seen in FIG. 3, comprises a series of mold plates described in detail below which are movable and which carry the various parts of the mold means forming the mold cavity. In this way, the various cavity forming parts or segments may be separated in a desired sequence after molding of the device to enable the device to be removed from the molding machine. Such injection molding machines are well known in the art and, therefore, will be not be described in further detail herein other than with respect to the particular method of the present invention wherein the sequence of movement of the mold plates and the mold segments which they carry is unique.

The molding machine illustrated in FIG. 3 includes an upper mold plate 121 which has a recess 123 therein of dual stepped diameter. The upper mold segment 103, which is carried on a mold plate 125, is provided with a recess 127 therein in which a circular cross section portion 127 is aligned with the smaller diameter portion of the recess 123. The recess 127 in the upper mold segment 103 also includes a frustoconical section 129.

A hot tip or hot runner 131 of any suitable type known in the art is positioned in the cavity formed by the recesses 123, 127 and 129. The hot tip has a central passage 133 therein through which molten material is injected into the mold cavity. A corresponding passage 135 is provided in the upper mold segment 103 aligned with the passage 133 to complete the route for the injected material to the mold cavity. A coolant passage 137 is provided in the outer surface of the upper mold segment 103 and suitable annular seals are provided at 139.

The opening in the mold plate 125 which receives and supports the upper mold segment 103 includes a locating shoulder 141 in a stepped diameter opening 143 in the mold plate 125. The central mold segment 105 is carried in a circular recess 145 on a mold plate 147. The mold plate 147 is also provided with a circular opening 149 therethrough which receives an upwardly projecting cylindrical collar 151 integral with a mold plate 153 positioned immediately below the die plate 147. The die plate 147 is suitably cooled by provision of a coolant passage 155 therein surrounding the cylindrical projection 151.

The lower mold segment 107 engages the inner surface of the cylindrical projection 151 and a lower surface of the central mold segment 105, as well as the outer core 109. The lower mold segment 107 is supported on a plurality of support rods, one of which is shown at 157. The support rods 157 extend through openings 159 in the mold plate 153. Suitable coolant passages 161 are provided in the mold plate 153. The rods 157 also pass through openings 163 in a mold plate 165 immediately below the mold plate 153 and through openings 167 in a mold plate 169 immediately below the mold plate 165. The pins 167 are retained in position by a collar 171 mounted to a base mold plate 173 by suitable means, not shown. The collars 171 are accommodated in recesses 175 in the lower surface of the mold plate 169.

The outer core 109 is supported on and mounted to the mold plate 165 by a retainer ring 177 which is secured by means not shown in a mating recess 179 in the lower surface of the mold plate 165. Passages 181 are provided in the retaining ring 177 at suitable intervals to permit the pins or rods 157 to slide therein.

The inner core 111 is coaxial with the outer core 109 and movable with respect thereto. The inner core 111 is secured to the mold plate 169 by a mounting flange 183 which seats in a corresponding recess 185 and is suitably secured therein by means not shown. Below the mold cavity, the outer surface of the core 111 mates with the inner surface of the outer core 109 and is slidable with respect thereto as will be explained below.

The air injection tube 115, which is slidable with respect to the inner core 111 for reasons explained below, extends downwardly and is suitably supported in a fixed position on support means, not shown, by a mounting flange 187. An opening 189 is provided near the lower end of the tube 115 and an air supply tube 191 communicates with the interior of the tube 115 for injecting air under pressure into the interior of the tube. The tube 115 includes an upper portion 194 of reduced diameter in which the air plug 117 mates to seal off passage of air from the upper end of the tube 115. The plug 117 extends downwardly through the tube beyond its lower end and suitable means, not shown, are provided for withdrawing the plug 117 to allow ejection of a burst of air from the upper end of the air injection tube 115 for ejecting the molded device as explained below.

The lower plate 173, in operation of the molding machine, is suitably supported, by means not shown, in a fixed position. A shoulder or stripper bolt 193 extends through a passage 195 in the plate 173 and through a passage 197 of stepped diameter in the plate 169. A locater shoulder 199 is provided in the stepped diameter passage 197 in the plate 169 for reasons explained below, and the upper end of the bolt 193 is threadably secured against the lower surface of the plate 165 by a threaded connector 201. A locater flange 203 is provided at the end of the bolt 193 opposite the threaded section 201.

A passage 205 of stepped diameter is provided in the plate 165 and a shoulder bolt 207 passes there-through. The bolt 207 is secured to the plate 153 in a threaded region 209 and the opposite end of the bolt 207 is provided with a locater flange 211 which is accommodated by a recess 213 in the upper surface of the mold plate 169. The stepped diameter of the passage 205 provides a locater shoulder 215 for reasons which will be explained below.

A slanted shoulder pin 217, fixed to the mold plate 165 by a flange 219, extends through the mold plate, and through openings 221 and 223 in the mold plates 153 and 147, respectively. For reasons which will be explained below, the size of the opening 221 is substantially larger than the size of the opening 223 in the direction away from the mold. The upper end of the pin 217 extends into an opening 225 in the mold plate 125. The opening 225 is so shaped to clear the end of the angled pin 217 when the plate 125 is moved vertically upward, as will be described below. A second slanted shoulder pin, not shown, is provided as a mirror image to the pin 217.

The operation of the molding apparatus to form the closure device 10 will now be described with particular reference to FIGS. 3, 4, 5 and 6. The figures illustrate, in sequence, the operation of the molding apparatus after the mold has been filled with the molded material to form the closure device and the material has solidified. In particular, FIG. 3 indicates the latter condition with the mold cavity fully closed and after the moldable material has been injected through the cavity through the passages 133 and 135.

Figure 4:
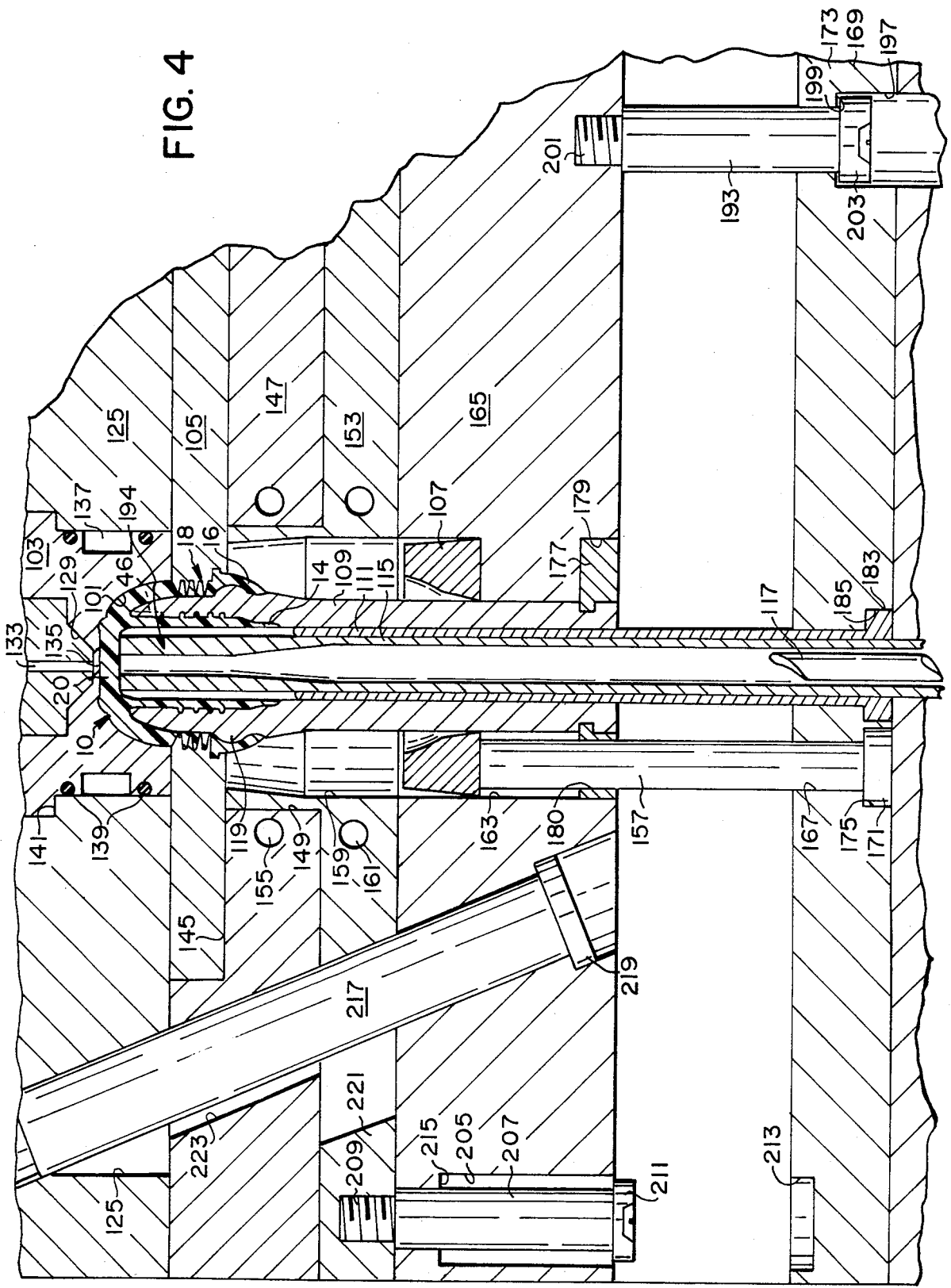
FIG. 4 is a schematic full section view illustrating an initial step in removal of the closure device from the mold after molding as shown in FIG. 3.

After the elapse of a period of time sufficient to permit a desired degree of solidification of the injected material, the molding machine first operates to move the die plates 165, 147, 125, and 121 to the position shown in FIG. 4 relative to the plates 169 and 173. In this position, effectively, the lower mold segment or end portion 107 is lowered from engagement with the central mold segment 105 into the opening 159 in the mold plate 153. In this condition, the flange 203 on the bolt 193 abuts the shoulder 199 in the opening 197, preventing further movement of the mold plate 165.

In the condition shown in FIG. 4, the lower end of the collar 16 is then unrestrained from expanding outwardly. This permits withdrawal of the outer core from the region between the collar 16 and the plug 14. However, because the force required to withdraw the outer core is substantial, due to the need to circumferentially expand the lower portion of the collar 16, the central mold segment 105 is left in place as the outer core 109 is withdrawn. Thus, the central mold segment 105, having the thread-like projections necessary to form the tear strip and tether portions, serves as a gripper to restrain the closure device 10 against the force of withdrawal of the outer core 109.

Figure 5:
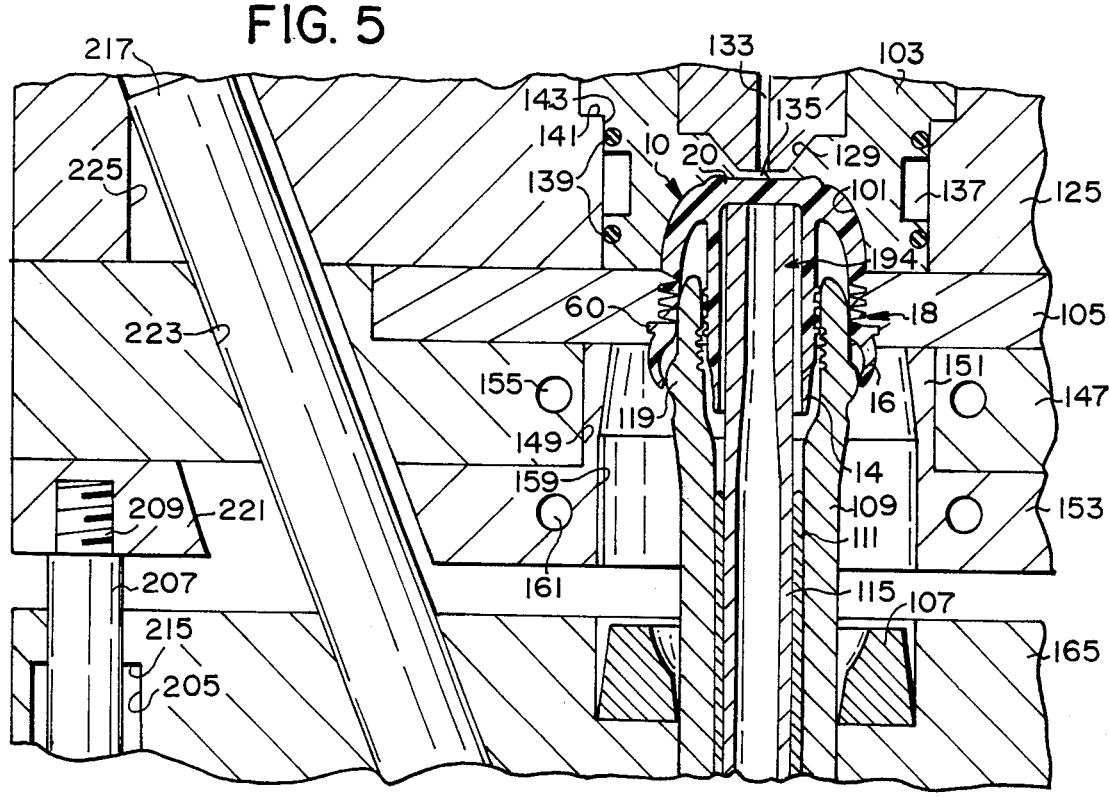
FIG. 5 is a schematic full section view illustrating a further step in removal of the closure device.

The withdrawal of the outer core 109 is shown more specifically in FIG. 5 and occurs as the result of the stoppage of the upward movement of the plate 165 by the flange 203 on the bolt 193. As the plates 165 and 153 separate, the outer core 109, being fixed to the plate 165 by the retaining ring 177, effectively withdraws the outer core 109 from the space between the collar 16 and the plug 14. The expansion of the lower end of the collar 16 illustrated in FIG. 5.

It will also be noted by comparing FIGS. 4 and 5 that, as the plate 147 moves upwardly, the edge of the opening 223, which is spaced from the pin 217 in the positions shown in FIGS. 3 and 4, moves upwardly into engagement with the pin 217. Once this occurs, since the pin 217 is restrained in a fixed position as a result of the restraining of the plate 165 from further movement, the pin exerts a lateral or horizontal component of force on the plate 147 in a direction away from the mold cavity. A pin similar to pin 217, not shown, is provided on the opposite side of the mold cavity in a mirror image configuration. The central mold segment 105 and the die plate 147 are constructed with a parting plane, indicated at 227 in FIG. 7. The horizontal forces exerted on the plate 147 by the pin 217 and its mirror image pin, not shown, cause separation of the central mold segment 105 and the plate 147 along the parting plane, withdrawing the gripping portion of the central mold segment (which forms the tear strip and tether) from engagement with the closure device. The provision of the ring 60 on the closure device also effectively provides a retaining shoulder, further enhancing the gripping effect of the central mold segment 105.

Figure 6:
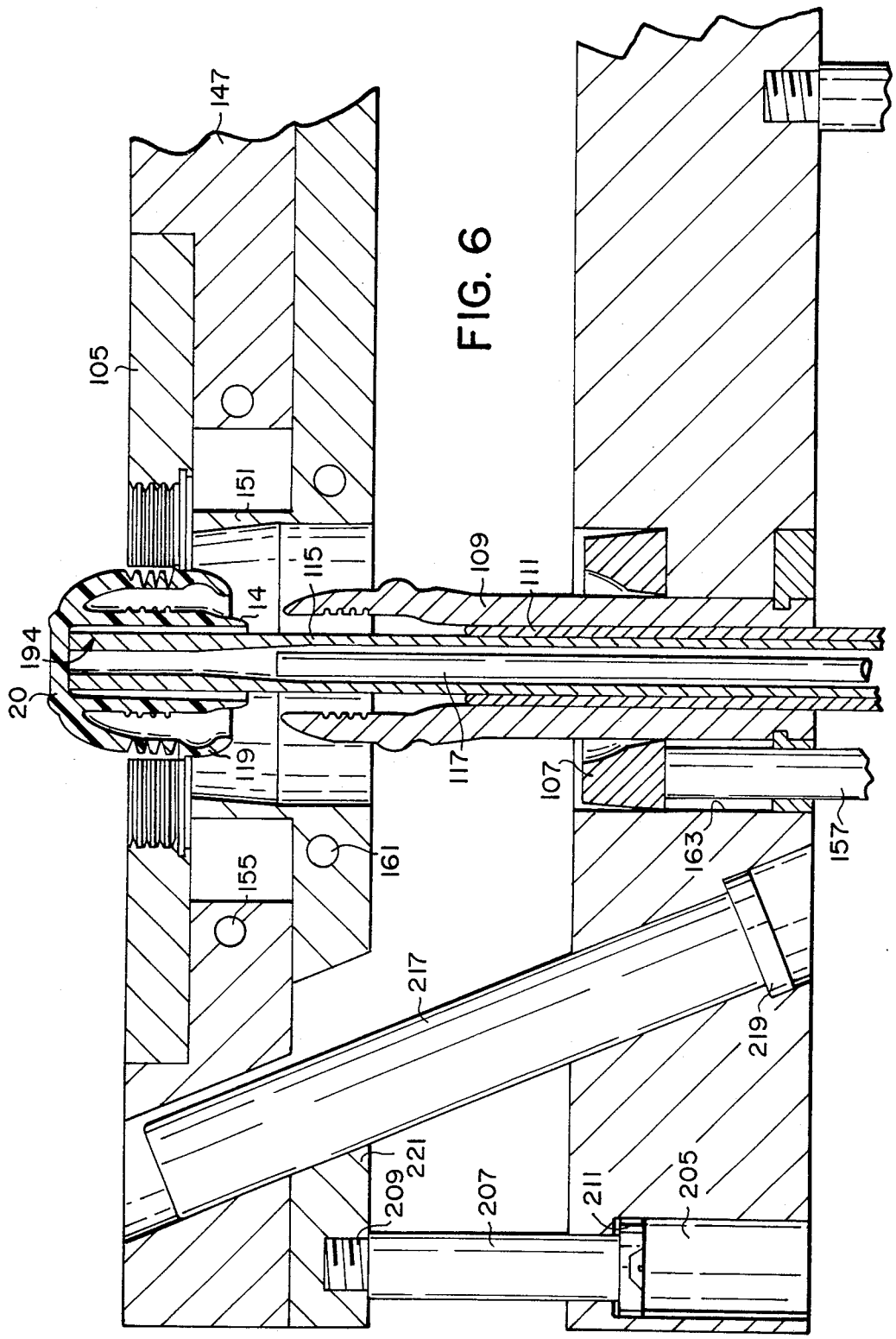
FIG. 6 is a schematic full section view illustrating a still further step in removal of the closure device.

In FIG. 6, the result of continued upward movement of the mold plates 147 and 153 is shown. Such movement terminates when the flange 211 of the bolt 207 abuts the shoulder 215 in the previously restrained plate 165. At this time, the bolt pin has forced the central mold segment 107 and the mold plate 147 carrying it to their furthest separated position. Movement of the plate 121 continues upwardly along with the plate 125, removing the hot tip and the upper mold segment 103 a sufficient distance from the top surface of the mold segment 105 to allow the closure device 10 to be ejected. This occurs upon retraction of the rod 117, which causes the air within the tube 115 to force the closure device 10 upwardly from its position atop the tube 117. Suitable means, not illustrated, may be employed to sweep the closure device from the upper surface of the central mold segment 105 into a receiving container or other device.

Retraction of the inner core occurs upon upward movement of the plate 165 with respect to the plate 169 and at the same time that the lower mold segment 107 is retracted. Since the inner core is able to slide along the outer surface of the tube 115 and along the inner surface of the plug 14, and since the closure device 10 is securely retained by the central mold segment 105, the central core 111 is easily withdrawn from the mold cavity.

Figure 7:
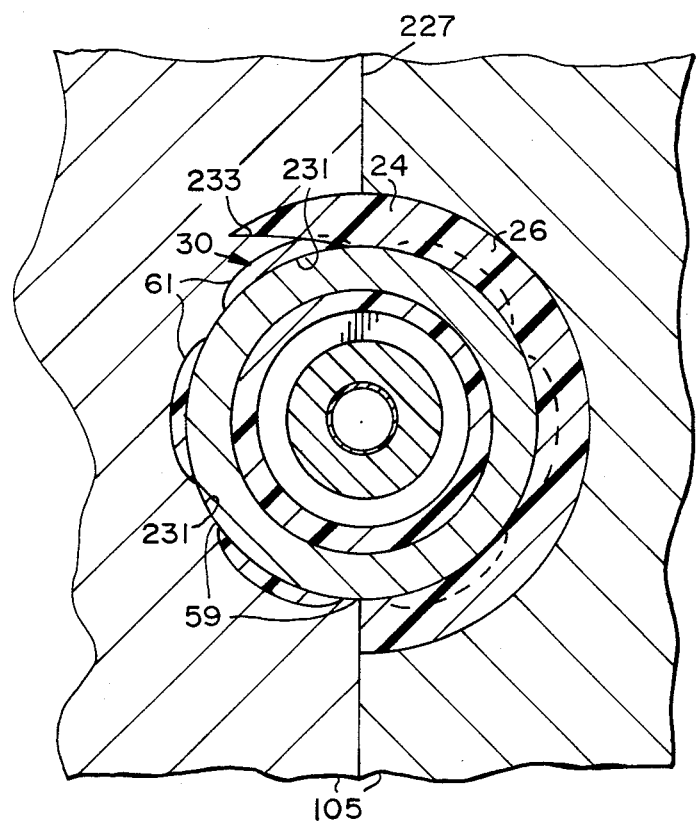
FIG. 7 is a full section view taken along the line 7—7 of FIG. 3.

Referring more particularly to FIG. 7, a preferred configuration of the central mold segment 105 may be more clearly seen. The tear strip 26 may be clearly seen as it moves in a clockwise direction in a helix descending into the plane of the paper so that, at the parting plane 227 toward the lower edge of FIG. 7, the tear strip descends below the section plane. Thus, at the left hand side of the parting plane 227 in FIG. 7, there is illustrated one of the two frangible webs 30 comprised of a series of segments 61 spaced apart by openings 59. The openings are formed by extensions 231 on the central mold segment 105 which project far enough to abut the outer core 109. Those regions wherein the thread-like projections on the central mold segment which form the frangible webs do not abut the outer core allow the mold material to flow therein and form the segments 61.

As may also be seen in FIG. 7, the tab 24 of the tear strip 26 is formed by providing a mating recess 233 in one side of the separable central mold segment 105. By properly aligning the configuration of the recess 233 with the direction of separation of the two parts of the central mold segment 105, withdrawal of the tab 24 meets with little resistance upon separation of the two parts of the central mold segment 105. It may also be seen that the tab 24 lies close to or within the outer diameter of the tear-strip to permit a decorative outer cover or capsule to be applied and to avoid interfering with insertion apparatus.

Although the invention has been described herein in connection with a particular preferred form of closure device, it will be apparent to those skilled in the art that the configuration of the closure device may vary in certain respects and for various reasons without diminishing the applicability and significance of the mold of the invention. Thus, the invention is applicable to any situation wherein a closure device is to be molded, which closure device has a cap portion, a cylindrical plug portion extending therefrom, and a cylindrical collar extending substantially coextensively and coaxially with the plug portion spaced therefrom to provide an annular cavity for receiving the open end of the container to be closed. Moreover, the mold of the invention is particularly useful in situations wherein the core or cores used in molding the closure device are difficult to withdraw from the device after molding.

Various modifications of the invention in addition to those shown and described herein will become apparent to those skilled in the art from the foregoing description and accompanying drawings. Such modifications are intended to fall within the scope of the appended claims.

What is claimed is:

1. A mold for forming a closure device having a cap portion, a cylindrical plug portion extending therefrom, and a cylindrical collar extending substantially coextensively and coaxially with the plug portion spaced therefrom to provide an annular cavity for receiving the open end of the container to be closed, said mold comprising, mold means enclosing a mold cavity defining the outer surface of the closure device, substantially cylindrical hollow outer core means extending into said mold cavity and defining the annular cavity in the closure device including the inner surface of the cylindrical collar and the outer surface of the plug portion, said mold means including a gripping portion for retaining the closure device when said outer core means are extracted from the annular cavity, said gripping portion of said mold means comprising means for forming a tear strip and tether section in the cylindrical collar of the closure device.

2. A mold according to claim 1 wherein said mold means further include an end portion defining at least a portion of the cylindrical collar opposite the cap portion, said end portion of said mold means being movable to separate from the end of the cylindrical collar prior to retraction of said outer core means from the annular cavity.

3. A mold according to claim 2 wherein said end portion of said mold means and said outer core means are engageable to close said mold cavity.

4. A mold according to claim 1 wherein said outer core means include an annular coaxial outward protuberance for forming an annular recess in the inner surface of the collar for retaining the collar on the container.

5. A mold according to claim 1 wherein said gripping portion of said mold means is separable along a parting plane including the axis of said substantially cylindrical hollow outer core means.

6. A mold according to claim 1 wherein said mold means further include a mold cap portion for defining the outer surface of the cap portion of the closure device, said mold cap portion being movable to permit removal of the closure device from said mold cavity.

7. A mold according to claim 1 wherein the cylindrical plug portion is hollow and wherein said mold means include inner core means defining the inner surface of said hollow cylindrical plug portion.

8. A mold according to claim 7 wherein said outer core means and said inner core means are engageable to close said mold cavity.

9. A mold according to claim 7 wherein said mold means include a central column extending coaxially with said inner core means, said central column including an air ejection tube and a retractable support plug coaxial and coextensive therewith.

* * * * *